United States Patent
Chu et al.

(10) Patent No.: US 10,863,502 B1
(45) Date of Patent: *Dec. 8, 2020

(54) METHODS AND APPARATUS FOR CARRYING OUT BACKOFF OPERATIONS

(71) Applicant: NXP USA, Inc., Austin, TX (US)

(72) Inventors: Liwen Chu, San Ramon, CA (US); Lei Wang, San Diego, CA (US); Jinjing Jiang, San Jose, CA (US); Hongyuan Zhang, Fremont, CA (US); Hui-Ling Lou, Sunnyvale, CA (US)

(73) Assignee: NXP USA, INC., Austin, TX (US)

( * ) Notice: Subject to any disclaimer, the term of this patent is extended or adjusted under 35 U.S.C. 154(b) by 176 days.

This patent is subject to a terminal disclaimer.

(21) Appl. No.: 16/055,882

(22) Filed: Aug. 6, 2018

Related U.S. Application Data

(63) Continuation of application No. 14/961,558, filed on Dec. 7, 2015, now Pat. No. 10,045,340.

(Continued)

(51) Int. Cl.
*H04W 72/04* (2009.01)
*H04W 76/11* (2018.01)
*H04W 24/10* (2009.01)
*H04W 84/12* (2009.01)
*H04L 29/12* (2006.01)

(52) U.S. Cl.
CPC ....... *H04W 72/0446* (2013.01); *H04W 24/10* (2013.01); *H04W 76/11* (2018.02); *H04L 61/6022* (2013.01); *H04W 84/12* (2013.01)

(58) Field of Classification Search
None
See application file for complete search history.

(56) References Cited

U.S. PATENT DOCUMENTS 9,804,918 B1 10/2017 Zhang et al.
9,826,532 B1 11/2017 Chu et al.
(Continued)

FOREIGN PATENT DOCUMENTS

WO WO-2015/147874 10/2015

OTHER PUBLICATIONS

U.S. Appl. No. 62/086,516, Yongho, "RTS and CTS Procedure for Dynamic CCA," filed Dec. 2, 2014.
(Continued)

*Primary Examiner* — Alex Skripnikov
*Assistant Examiner* — Sharmin Chowdhury

(57) ABSTRACT

A method is carried out on a device capable of utilizing a high efficiency wireless local area network (HEW) communication protocol and a legacy communication protocol, and includes wirelessly receiving a communication frame; when the measured energy level of the frame exceeds a static clear channel assessment (CCA) energy level, identifying the BSS to which the frame corresponds, wherein identifying the BSS to which the frame corresponds comprises utilizing a BSS identifier included in the frame when the frame is an HEW frame or utilizing a MAC address included in the frame when the frame is a legacy frame; when the frame corresponds to the same BSS as the device, processing the frame utilizing the static CCA energy level; and when the frame corresponds to an overlapping OBSS, processing the frame utilizing a dynamic CCA energy level.

17 Claims, 9 Drawing Sheets

Related U.S. Application Data

(60) Provisional application No. 62/088,245, filed on Dec. 5, 2014.

(56) References Cited

U.S. PATENT DOCUMENTS

| | | | |
|---|---|---|---|
| 9,876,614 | B1 | 1/2018 | Sun et al. |
| 9,942,193 | B1 | 4/2018 | Chu et al. |
| 10,045,340 | B1 | 8/2018 | Chu et al. |
| 2004/0004973 | A1 | 1/2004 | Lee |
| 2007/0071010 | A1 | 3/2007 | Iyer et al. |
| 2007/0110091 | A1 | 5/2007 | Kwon |
| 2008/0144591 | A1 | 6/2008 | Jokela |
| 2009/0252053 | A1* | 10/2009 | Leith ................ H04W 24/10 370/252 |
| 2010/0020746 | A1 | 1/2010 | Zaks |
| 2012/0099507 | A1 | 4/2012 | Zhang et al. |
| 2012/0327870 | A1 | 12/2012 | Grandhi et al. |
| 2013/0229996 | A1 | 9/2013 | Wang et al. |
| 2014/0119288 | A1 | 5/2014 | Zhu et al. |
| 2014/0286203 | A1 | 9/2014 | Jindal et al. |
| 2014/0328270 | A1 | 11/2014 | Zhu et al. |
| 2015/0103727 | A1 | 4/2015 | Zhang et al. |
| 2015/0131517 | A1 | 5/2015 | Chu et al. |
| 2015/0163824 | A1 | 6/2015 | Krzymien et al. |
| 2016/0007379 | A1 | 1/2016 | Seok |
| 2016/0014804 | A1 | 1/2016 | Merlin et al. |
| 2016/0050691 | A1* | 2/2016 | Jauh ................ H04W 74/0808 370/252 |
| 2016/0065467 | A1 | 3/2016 | Wu et al. |
| 2016/0165574 | A1 | 6/2016 | Chu et al. |
| 2016/0165589 | A1 | 6/2016 | Chu et al. |
| 2016/0174254 | A1 | 6/2016 | Hedayat |
| 2016/0353275 | A1 | 12/2016 | Liu et al. |
| 2017/0105143 | A1 | 4/2017 | Seok |
| 2017/0289987 | A1 | 10/2017 | Seok |

OTHER PUBLICATIONS

Chun et al. "Legacy Support on HEW frame structure," doc: IEEE 11-13/1057r0, *The Institute of Electrical and Electronics Engineers, Inc.*, pp. 1-8 (Sep. 2013).

Hiertz et al., "The IEEE 802.11 Universe," IEEE Communications Magazine, pp. 62-70, (Jan. 2010).

IEEE Std 802.11ac/D2.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-359 (Jan. 2012).

IEEE Std 802.11ac/D2.1 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-363 (Mar. 2012).

IEEE Std 802.11ac/D3.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-385 (Jun. 2012).

IEEE Std 802.11ac/D4.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-408 (Oct. 2012).

IEEE Std 802.11ac/D5.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-440 (Jan. 2013).

IEEE Std 802.11ac/D6.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *Thhe Institute of Electrical and Electronics Engineers, Inc.*, pp. 1-446 (Jul. 2013).

IEEE Std 802.11ac/D7.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-456 (Sep. 2013).

IEEE Std 802.11™ 2012 (Revision of IEEE Std 802.11-2007) IEEE Standard for Information technology—Telecommunications and information exchange between systems—Local and metropolitan area networks—Specific requirements Part 11: Wireless LAN Medium Access Control (MAC) and Physical Layer (PHY) specifications, The Institute of Electrical and Electronics Engineers, Inc., pp. 1-2695 (Mar. 29, 2012).

Itagaki et al., "Dynamic CCA Control and TPC Simulation Results with SS1~SS3," IEEE Draft, IEEE 802.11-15/1045r0 Submission, 54 pages (Sep. 14, 2015).

Stacey et al., "IEEE P802.11, Wireless LANs, Proposed TGac Draft Amendment," Institute of Electrical and Electronics Engineers, doc. No. IEEE 802.11-10/1361r3 pp. 1-154 (Jan. 2011).

Stacey et al., "Specification Framework for TGac," document No. IEEE 802.11-09/0992r20, *Institute for Electrical and Electronics Engineers*, pp. 1-49, (Jan. 18, 2011).

Tandai et al., "An Efficient Uplink Multiuser MIMO Protocol in IEEE 802.11 WLANs," IEEE 20th International Symposium on Personal, Indoor and Mobile Radio Communications (PIMRC 2009), pp. 1153-1157 (Sep. 13, 2009).

U.S. Appl. No. 14/961,512, filed Dec. 7, 2015.
U.S. Appl. No. 14/963,045, filed Dec. 8, 2015.
U.S. Appl. No. 15/337,474, filed Oct. 28, 2016.

\* cited by examiner

METHODS AND APPARATUS FOR CARRYING OUT BACKOFF OPERATIONS

CROSS-REFERENCE TO RELATED APPLICATION

This application is a continuation of U.S. patent application Ser. No. 14/961,558, now U.S. Pat. No. 10,045,340, filed Dec. 7, 2015, entitled "METHODS AND APPARATUS FOR CARRYING OUT BACKOFF OPERATIONS," which claims the benefit of U.S. Provisional Patent Application No. 62/088,245, filed Dec. 5, 2014, entitled "11a/g/n/ac PPDU, DYNAMIC CCA AND BACKOFF." Both of the applications referenced above are hereby incorporated herein by reference in their entireties.

FIELD OF THE DISCLOSURE

The present disclosure relates generally to communication networks and, more particularly, to wireless local area networks that utilize orthogonal frequency division multiplexing (OFDM).

BACKGROUND

The Institute for Electrical and Electronics Engineers (IEEE) 802.11 family of Standards (generally "802.11") has gone through several iterations over the last decade. In some of the 802.11 standards, such as 802.11ah and beyond, the identity of the Basic Service Set (BSS) (e.g., as managed by an access point (AP) of the BSS) is indicated in a Physical Layer Convergence Procedure (PLCP) Protocol Data Unit (PPDU) by a set of bits that described the "color" of the BSS. The color of a BSS corresponds to an identifier (ID) of the BSS that is shorter than a BSS identifier (BSSID) defined by 802.11. The BSS color may be contained in the Physical Layer (PHY) Signal (SIG) field in a PHY header of a PPDU, whereas the BSSID is typically included in a media access control (MAC) portion of PPDUs. A device (e.g., an AP or client) in a BSS can determine whether a PPDU is from the BSS to which the device belongs (the "same-BSS") or some other BSS (e.g., an overlapping BSS (OBSS)) by decoding the SIG field and interpreting BSS color bits included therein.

One of the newer implementations of 802.11 being discussed is 802.11ax (sometimes referred to as 802.11 HE or 802.11 HEW). 802.11ax contemplates dynamically adjusting the energy level at which a channel is deemed to be clear depending on whether the energy corresponds to same-BSS signals or to signals from another BSS. Such a scheme helps to promote spatial reuse between neighboring networks.

SUMMARY

In an embodiment, a method is carried out on a device capable of utilizing a high efficiency wireless local area network (HEW or HE) communication protocol and a legacy communication protocol, and includes: wirelessly receiving a communication frame; when the measured energy level of the frame exceeds a static clear channel assessment (CCA) energy level, identifying the BSS to which the frame corresponds, wherein identifying the BSS to which the frame corresponds includes utilizing a BSS identifier included in the frame when the frame is an HEW frame, or utilizing a MAC address included in the frame when the frame is a legacy frame; when the frame corresponds to the same BSS as the device, processing the frame utilizing the static CCA energy level; and when the frame corresponds to an OBSS, processing the frame utilizing a dynamic CCA energy level.

In an embodiment, a method is carried out on a device capable of utilizing an HEW communication protocol and a legacy communication protocol, and includes: determining that a shared wireless communication medium is idle based on a static CCA level; counting down in a backoff procedure based on the determination; wirelessly receiving a communication frame; measuring the energy level of the frame; when the measured energy level of the frame exceeds the static CCA energy level, ceasing to count down in the backoff procedure; identifying the BSS to which the frame corresponds; and when the frame corresponds to an OBSS and the energy of the frame is lower than a dynamic CCA energy level, resuming the countdown.

In an embodiment, a method is carried out on a wireless device and includes forming a frame according to a wireless communication protocol, wherein the public action frame includes a BSS identifier indicating that the frame is a public action frame; and wirelessly transmitting the frame.

In an embodiment a wireless device is configured to perform one or more of the above-described methods.

DETAILED DESCRIPTION

In order for communication device that is compliant with a first communication protocol (e.g., 802.11ax) to determine whether a given transmission corresponds to a same-BSS or to an OBSS, the device may obtain the BSS color from the transmission and compare the BSS color to a color of the BSS to which the device belongs. If the BSS colors are the same, the device may conclude that the transmission corresponds to the same-BSS. If they are different, then the device may conclude that the transmission corresponds to an OBSS. If the transmission corresponds to an OBSS, the device may then use dynamic CCA. However, not all transmissions in a wireless network will necessarily have BSS color information. Some transmissions, for example transmissions compliant with a second communication protocol that is a legacy protocol (referred to herein as "legacy transmissions" or "legacy frames"), do not specify BSS color.

According to an embodiment, a device in a wireless communication network may determine whether a legacy transmission corresponds to a same-BSS or an OBSS by checking a MAC address in the transmission and determining whether the MAC address is the same as the MAC address of the AP with which the device is associated. If they are the same, then the device determines that the legacy transmission corresponds to the same-BSS and uses static CCA. If the MAC address in the transmission is not the same as the MAC address of the AP, then the device determines that the legacy transmission corresponds to an OBSS and, consequently, uses dynamic CCA.

In an embodiment, certain transmissions, even if received from an OBSS, are processed using static CCA. Such transmissions include public action frames, for example, or other suitable frames.

According to an embodiment, public action frames include a special BSS color that is specifically reserved for public action frames.

Figure 1:
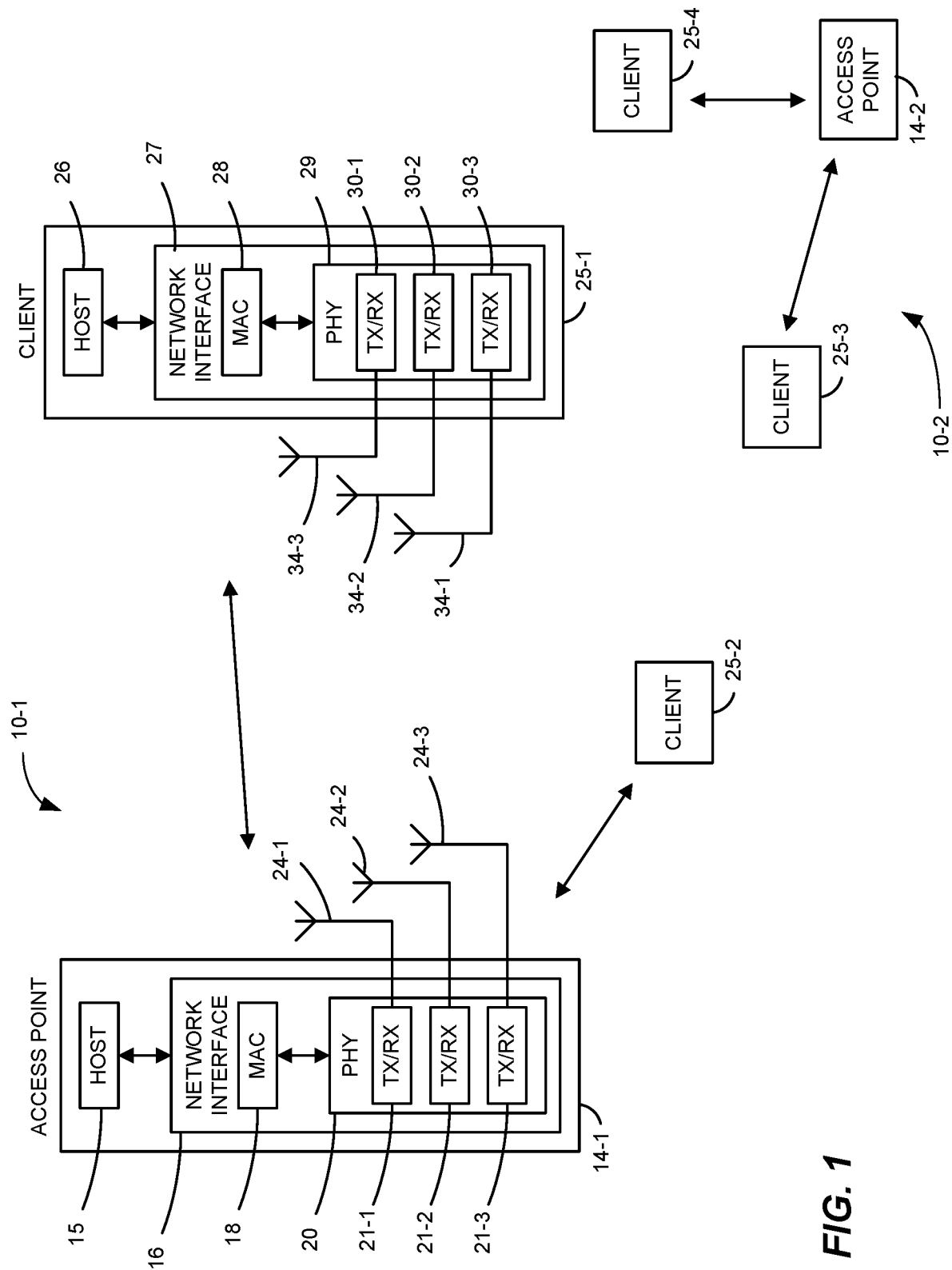
FIG. 1 is a block diagram of an example wireless local area network (WLAN), according to an embodiment.

FIG. 1 is a block diagram of example wireless local area networks (WLANs) 10-1 and 10-2, according to an embodiment. The number of WLANs depicted is only intended to be illustrative, and any number may be present. Each WLAN 10 includes at least one AP 14. The configuration of the AP 14 may vary among different embodiments, but a typical configuration will now be described, using the AP 14-1 as an example. The AP 14-1 includes a host processor 15 coupled to a network interface device 16. The network interface device 16 includes a MAC processing unit 18 and PHY processing unit 20. The PHY processing unit 20 includes a plurality of transceivers 21, and the transceivers 21 are coupled to a plurality of antennas 24. Although three transceivers 21 and three antennas 24 are illustrated in FIG. 1, the AP 14-1 includes different numbers (e.g., 1, 2, 4, 5, etc.) of transceivers 21 and antennas 24 in other embodiments. Although AP 14 includes the same number of transceivers 21 and antennas 24, in other embodiments the AP 14 includes a different number of transceivers 21 than antennas 24 and antenna switching techniques are utilized.

In various embodiments, the network interface device 16 is implemented on one or more integrated circuit (IC) devices. For example, in an embodiment, at least a portion of the MAC processing unit 18 is implemented on a first IC device and at least a portion of the PHY processing unit 20 is implemented on a second IC device. As another example, at least a portion of the MAC processing unit 18 and at least a portion of the PHY processing unit 20 are implemented on a single IC device.

Each WLAN 10 includes a plurality of client stations 25. Although two client stations 25 are illustrated in FIG. 1, each of the WLANs 10 includes different numbers (e.g., 1, 2, 3, 5, 6, etc.) of client stations 25 in various scenarios and embodiments.

The configuration of the client station 25 may vary among different embodiments, but a typically configuration will now be described, using the client station 25-1 as an example. The client station 25-1 includes a host processor 26 coupled to a network interface device 27. The network interface device 27 includes a MAC processing unit 28 and a PHY processing unit 29. The PHY processing unit 29 includes a plurality of transceivers 30, and the transceivers 30 are coupled to a plurality of antennas 34. Although three transceivers 30 and three antennas 34 are illustrated in FIG. 1, the client station 25-1 includes different numbers (e.g., 1, 2, 4, 5, etc.) of transceivers 30 and antennas 34 in other embodiments. Although the client station 25-1 includes the same number of transceivers 30 and antennas 34, in other embodiments the client station 25-1 includes a different number of transceivers 30 than antennas 34 and antenna switching techniques are utilized.

In various embodiments, the network interface device 27 is implemented on one or more IC devices. For example, in an embodiment, at least a portion of the MAC processing unit 28 is implemented on a first IC device and at least a portion of the PHY processing unit 29 is implemented on a second IC device. As another example, at least a portion of the MAC processing unit 28 and at least a portion of the PHY processing unit 29 are implemented on a single IC device.

In an embodiment, one or more of the other client stations of the WLANs 10 have a structure the same as or similar to the client station 25-1. In these embodiments, the client stations 25 structured like the client station 25-1 have the same or a different number of transceivers and antennas. For example, the client station 25-2 has only two transceivers and two antennas (not shown), according to an embodiment. These same variations may be present in the client stations 25 of the second WLAN 10-2.

In an embodiment, each AP 14 is configured to operate according to a wireless communication protocol that utilizes Orthogonal Frequency Multiple Division Access (OFDMA) technology and/or multi-user multiple input, multiple output (MU-MIMO) technology.

In an embodiment, each AP 14 (e.g., the network interface device 16 of the AP 14) is configured to transmit independent data simultaneously to multiple client stations 25 via different spatial streams (e.g., downlink (DL) MU-MIMO) and/or via different OFDM sub-channels (e.g., DL OFDMA). In an embodiment, the AP 14 (e.g., the network interface device 16 of the AP 14-1) is configured to receive independent data simultaneously from multiple client stations 25 via different spatial streams (e.g., uplink (UL) MU-MIMO) and/or via different OFDM sub-channels (e.g., UL OFDMA). In some embodiments, two or more of the client stations 25 are configured to receive respective data streams that are transmitted simultaneously by the AP 14 (e.g., DL OFDMA and/or DL MU-MIMO). For example, in one embodiment, the network interface device 27 is configured to receive a data stream among a plurality of independent data streams transmitted simultaneously by the AP 14 to multiple client stations 25 via different spatial streams and/or via different OFDM sub-channels. In other embodiments, two or more of the client stations 25 additionally or alternatively are configured to transmit corresponding data streams to the AP 14 such that the AP 14 receives the data streams simultaneously (e.g., UL OFDMA and/or UL MU-MIMO). For example, in one embodiment, the network interface device 27 is configured to transmit a data stream while one or more other client stations 25 transmit one or more other independent data streams transmitted simultaneously to the AP 14 via different spatial streams and/or via different OFDM sub-channels.

In an embodiment, the AP 14 and the client stations 25 contend for communication medium using carrier sense multiple access with collision avoidance (CSMA/CA) protocol or another suitable medium access protocol. In an embodiment, the AP 14 and the client stations employ a CCA procedure, in which the AP/client station determines the energy level of the medium in order to determine whether the medium is busy or idle. If the medium is idle, the device can count down the backoff counter. If the backoff counter reaches a predetermined number (e.g., 0), the device can transmit. If the medium is busy, the device waits until the medium is idle and then counts down the backoff counter while the medium is idle. A threshold energy level for determining whether the medium is idle or busy may depend upon the bandwidth of the channel being used by the device and on whether the energy corresponds to a transmission that conforms to the wireless communication protocol. For example, in 802.11, if the channel bandwidth is 20 Megahertz (MHz), the threshold level is −82 decibel-milliwatts (dBm) for energy from valid 802.11 transmissions. For channel bandwidths of 40 MHz, 80 MHz, and 160 MHz, the threshold levels are −79 dBm, −76 dBm, and −73 dBm, respectively. Using these levels for CCA is referred to herein as a "static CCA" procedure. For energy not identified by the device as a valid 802.11 signal, the threshold level is −62 dBm.

In an embodiment, the AP 14 and the client stations 25 may also employ a dynamic CCA procedure. In the dynamic CCA procedure, the AP/client station may use a higher threshold level for valid 802.11 signals from an OBSS as compared to the threshold level for valid 802.11 signals from the same BSS. For example, an AP/client station might deem a 20 MHz channel to be idle if the energy level of an 802.11 signal from another BSS is less than −62 dBm (i.e., the same threshold level as for energy corresponding to signals that are not valid 802.11 signals), but deem the channel to be busy if the energy level of an 802.11 signal from the same BSS is greater than −82 dBm. Thus, an energy level of −70 dBm of a valid 802.11 signal from a different BSS would result in the device determining that the channel is idle, while an energy level of −70 dBm resulting from same-BSS signals would result in the device determining that the channel is busy. Allowing a higher CCA level for transmissions corresponding to another BSS helps to promote spatial reuse between different BSSs, at least in some embodiments and/or scenarios.

Further, in an embodiment, the AP 14 or a client station 25 dynamically selects a bandwidth for a transmission based on channels available for the transmission. In some embodiments, communication between the AP 14 and the client stations 25 can occur in a primary channel of the WLAN 10, in both a primary and a secondary channel of the WLAN 10, exclusively on a secondary channel of the WLAN 10, etc. The AP may assign the primary and the non-primary communication channels in any suitable manner to the one or more client stations, in various embodiments. In an embodiment, the AP 14 is configured to transmit different independent data to different client stations 25 simultaneously by generating an OFDMA data unit that includes different independent data modulated in respective sub-channels of a communication channel. In an embodiment, each sub-channel includes one or more sub-channel blocks, each sub-channel block corresponding to a set of sub-carriers within the OFDMA data unit. In an embodiment, the AP 14 allocates different sub-channels to different client stations and generates the OFDMA data unit that respective data is modulated in sub-channel blocks corresponding to the sub-channels allocated to the client stations.

Figure 2:
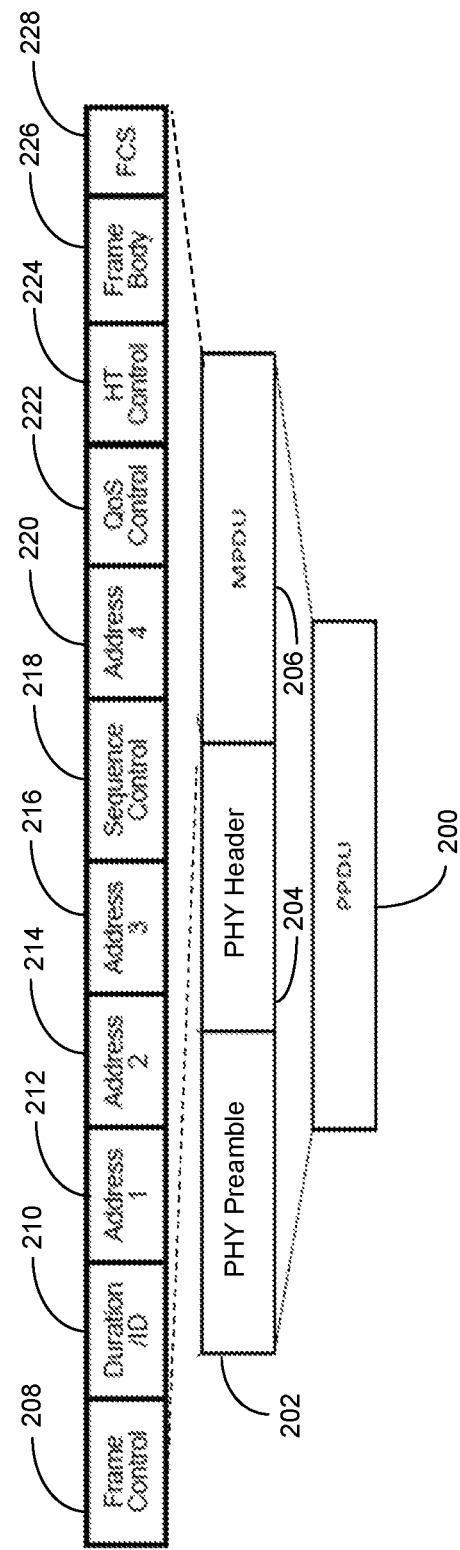
FIG. 2 is a diagram of communication frame, according to an embodiment.

FIG. 2 is a diagram of an example communication frame, designated as PPDU 200, that a device of the WLAN 10 (either AP 14 or client station 25) generates and transmits according to an embodiment. The PHY protocol data unit (PPDU) includes a PHY preamble 202, a PHY header 204, and a MAC protocol data unit (MPDU) 206. The MPDU 206 includes a Frame Control field 208, a Duration/ID field 210, an Address 1 field 212, and Address 2 field 214, an Address 3 field 216, a Sequence Control field 218, an Address 4 field 220, a Quality of Service (QoS) Control field 222, a high throughput (HT) Control field 224, a Frame Body field 226, and a frame check sequence (FCS) field 228. The Frame Control field 208 includes one or more Distribution System (DS) bits, including a To DS bit and a From DS bit.

If the PPDU 200 is compliant with a first communication protocol, such as 802.11ax, then the PHY preamble 202 includes a BSS color field (e.g., in a signal (SIG) field) having an identifier of the BSS to which the PPDU 200 corresponds, in an embodiment. If the PPDU 200 is a compliant with a protocol other than a first communication protocol, such as 802.11a, 802.11n, 802.11ac, etc., then the PHY preamble 202 does not include a BSS color field, in some embodiments.

Figure 3:
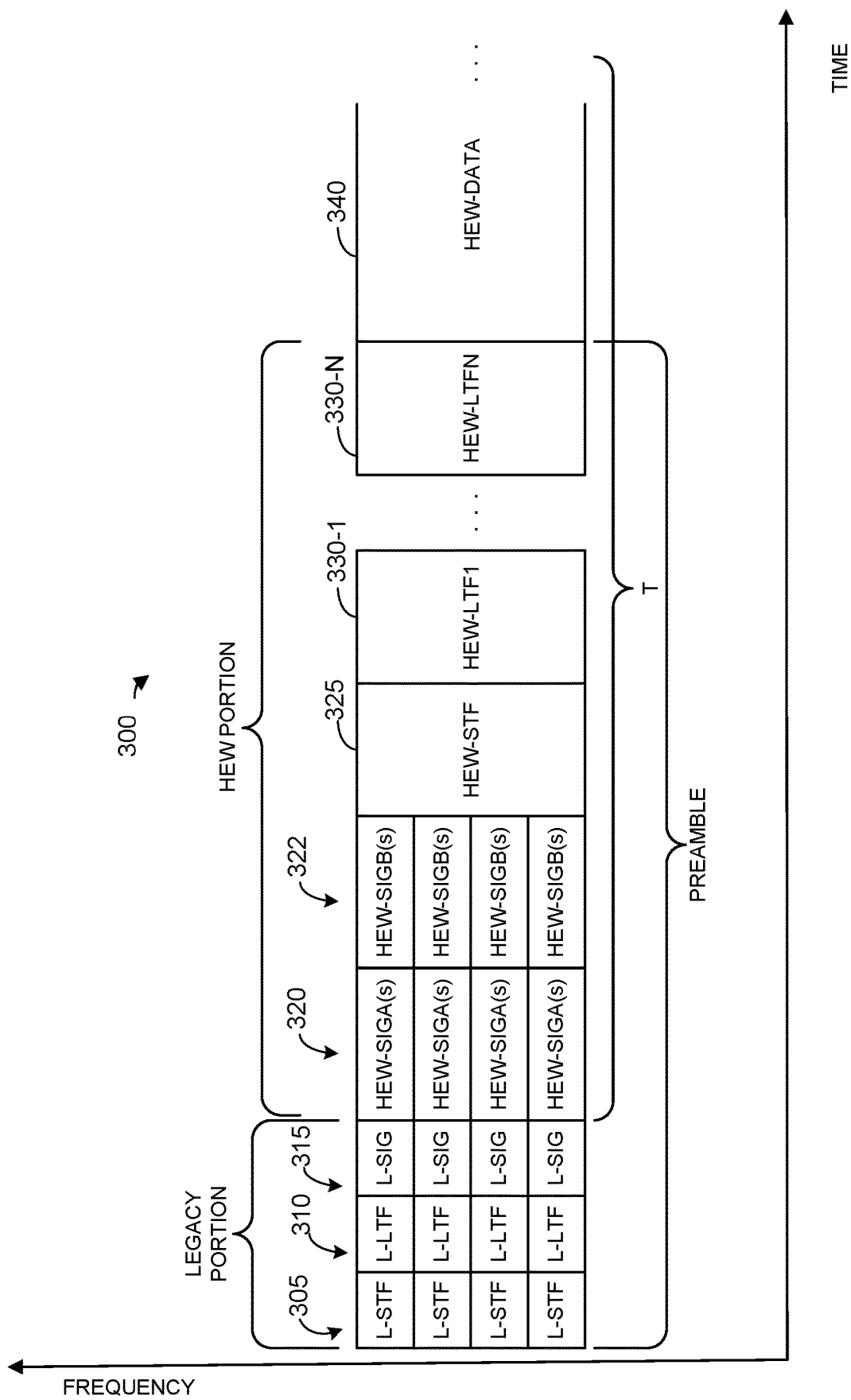
FIG. 3 is a diagram of an example PHY data unit, according to an embodiment.

FIG. 3 is a diagram of an OFDM PHY data unit 300, according to an embodiment. In some embodiments, an AP (e.g., the AP 14) is configured to generate and transmit OFDM PHY data units having a format such as illustrated in FIG. 3 to client stations (e.g., client stations 25), and/or a client station (e.g., the client station 25-1) is configured to transmit the data unit 300 to the AP (e.g., the AP 14). The PHY data unit 300 conforms to the first communication protocol (e.g., the HEW protocol) and occupies an 80 MHz band. In other embodiments, data units similar to the PHY data unit 300 occupy different suitable bandwidths such as 20 MHz, 40 MHz, 120 MHz, 160 MHz, or any other suitable bandwidth. The PHY data unit 300 is suitable for "mixed mode" situations, such as when a WLAN 10 includes a client station that conforms to a legacy protocol, but not the HEW protocol. The PHY data unit 300 can be utilized in other situations as well.

The PHY data unit 300 includes a PHY preamble having four legacy short training fields (L-STFs) 305; four legacy long training fields (L-LTFs) 310; four legacy signal fields (L-SIGs) 315; four first high efficiency WLAN signal fields (HEW-SIGAs) 320; four second high efficiency WLAN signal fields (HEW-SIGBs) 322; a high efficiency WLAN short training field (HEW-STF) 325; and N high efficiency WLAN long training fields (HEW-LTFs) 330, where N is a suitable positive integer. The data unit 300 also includes a high efficiency WLAN data portion (HEW-DATA) 340. The L-STFs 305, the L-LTFs 310, and the L-SIGs 315 form a legacy portion of the PHY preamble. The HEW-SIGA 320, the HEW HEW-SIGBs 322; the HEW-STF 325, and the HEW-LTFs 330 form a high efficiency WLAN (HEW) portion of the PHY preamble. In an embodiment, a color field is included in the HEW-SIGAs 320. In another embodiment, the color field is included in the HEW-SIGBs 322.

Each of the L-STFs 305, each of the L-LTFs 310, each of the L-SIGs 315, each of the HEW-SIGAs 320, and each of the HEW-SIGBs 322 occupy a 20 MHz band, in one embodiment. The data unit 300 is described as having an 80 MHz contiguous bandwidth for the purposes of illustrating an example frame format, but such frame format is applicable to other suitable bandwidths (including noncontiguous bandwidths). For instance, although the preamble of the data unit 300 includes four of each of the L-STFs 305, the L-LTFs 310, the L-SIGs 315, the HEW-SIGAs 320, and the HEW-SIGBs 322 in other embodiments in which an OFDM data unit occupies a cumulative bandwidth other than 80 MHz, such as 20 MHz, 40 MHz, 120 MHz, 160 MHz, etc., a different suitable number of the L-STFs 305, the L-LTFs 310, the L-SIGs 315, the HEW-SIGAs 320, and the HEW-SIGBs 322 are utilized accordingly. For example, for an OFDM data unit occupying a 20 MHz cumulative bandwidth, the data unit includes one of each of the L-STFs 305, the L-LTFs 310, the L-SIGs 315, the HEW-SIGAs 320, and the HEW-SIGBs 322; a 40 MHz bandwidth OFDM data unit includes two of each of the fields 305, 310, 315, 320, and 322; a 120 MHz bandwidth OFDM data unit includes six of each of the fields 305, 310, 315, 320, and 322; a 160 MHz bandwidth OFDM data unit includes eight of each of the fields 305, 310, 315, 320, and 322, and so on, according to some embodiments.

In the example PHY data unit 300, each of the HEW-STF 325, the HEW-LTFs 330, and the HEW-DATA 340 occupy the entire 80 MHz cumulative bandwidth of the data unit 300. Similarly, in the case of an OFDM data unit conforming to the HEW protocol and occupying a cumulative bandwidth such as 20 MHz, 40 MHz, 120 MHz, or 160 MHz, each of the HEW-STF 325, the HEW-LTFs 330, and the HEW-DATA 340 occupy the corresponding entire cumulative bandwidth of the data unit, in some embodiments.

In some embodiments, the 80 MHz band of the data unit 300 is not contiguous, but includes two or more smaller bands, such as two 40 MHz bands, separated in frequency. Similarly, for other OFDM data units having different cumulative bandwidths, such as a 160 MHz cumulative bandwidth, in some embodiments the band is not contiguous in frequency. Thus, for example, the L-STFs 305, the L-LTFs 310, the L-SIGs 315, the HEW-SIGAs 320, and the HEW-SIGBs 322 occupy two or more bands that are separated from each other in frequency, and adjacent bands are separated in frequency by at least one MHz, at least five MHz, at least 10 MHz, at least 20 MHz, for example, in some embodiments.

According to an embodiment, each of the L-STFs 305 and each of the L-LTFs 310 have a format as specified in a legacy protocol such as the IEEE 802.11a Standard, the IEEE 802.11n Standard, and/or the IEEE 802.11ac Standard. In an embodiment, each of the L-SIGs 315 has a format at least substantially as specified in legacy protocol (e.g., the IEEE 802.11a Standard, the IEEE 802.11n Standard, and/or the IEEE 802.11ac Standard). In such embodiments, the length and rate subfields in the L-SIGs 315 is set to indicate a duration T corresponding to the remainder of the data unit 300 after the legacy portion. This permits client stations that are not configured according to the HEW protocol to determine an end of the data unit 300 for CSMA/CA purposes, for example. For example, legacy client stations determine the duration of the remainder of the data unit 300 and refrain from accessing the medium (or at least transmitting in the medium) for the duration of the remainder of the data unit 300, in an embodiment. In other embodiments, each of the L-SIGs 315 has a format at least substantially as specified in legacy protocol (e.g., the IEEE 802.11a Standard, the IEEE 802.11n Standard, and/or the IEEE 802.11ac Standard) but with length field in the L-SIGs 315 set to indicate a duration of the time remaining in a transmission opportunity during which the data unit 300 is transmitted. In such embodiments, client stations that are not configured according to the HEW protocol determine an end of the transmission opportunity (TXOP) and refrain from accessing the medium (or at least transmitting in the medium) for the duration of the TXOP, in an embodiment.

In the PHY data unit 300, frequency domain symbols of the legacy portion are repeated over four 20 MHz subbands of the 80 MHz band. Legacy client stations that are configured to operate with 20 MHz bandwidth will recognize a legacy preamble in any of the 20 MHz subbands. In some embodiments, the modulations of the different 20 MHz subband signals are rotated by different suitable angles. In one example, a first subband is rotated 0 degrees, a second subband is rotated 90 degrees, a third subband is rotated 180 degrees, and a fourth subband is rotated 270 degrees, in an embodiment. In other examples, different suitable rotations are utilized. As just one example, a first subband is rotated 45 degrees, a second subband is rotated 90 degrees, a third subband is rotated −45 degrees, and a fourth subband is rotated −90 degrees, in an embodiment.

In some embodiments, the modulations of the HEW-SIGAs 320 in the different 20 MHz subbands is rotated by different angles. In one example, a first subband is rotated 0 degrees, a second subband is rotated 90 degrees, a third subband is rotated 180 degrees, and a fourth subband is rotated 270 degrees, in an embodiment. In other examples, different suitable rotations are utilized. As just one example, a first subband is rotated 45 degrees, a second subband is rotated 90 degrees, a third subband is rotated −45 degrees, and a fourth subband is rotated −90 degrees, in an embodiment. In an embodiment, the same rotations utilized in the legacy portion are utilized for the HEW-SIGAs 320. In some embodiments, the modulations of the HEW-SIGBs 322 in the different 20 MHz subbands are similarly rotated by different angles. In at least some examples, the HEW-SIGAs 320 are collectively referred to as a single HEW signal field (HEW-SIGA) 320. In at least some examples, the HEW-SIGBs 322 are collectively referred to as a single HEW signal field (HEW-SIGB) 322.

In an embodiment, the PHY data unit 300 is a single user data unit that includes data for only a single AP or only a single client station 25. In another embodiment, the data unit 300 is a multi-user data unit that includes independent data streams for multiple client stations 25 over respective spatial streams. In an embodiment in which the PHY data unit 300 is a multi-user data unit, a portion of the data unit 300 (e.g., the L-STFs 305, the L-LTFs 310, the L-SIGs 315, the HEW-SIGAs 320, and the HEW-SIGBs 322) is unsteered or omnidirectional (or "omnidirectional" or "pseudo-omnidirectional"; the terms "unsteered" and "omnidirectional" as used herein are intended to also encompass the term "pseudo-omnidirectional") and includes data that is common to all intended recipients of the data unit 300. The data unit 300 further includes a second portion (e.g., the HEW-STF 325, the HEW-LTFs 330, and the HEW-DATA portion 340) in which beamforming is applied to different spatial streams to shape, or beamform, transmission over the corresponding spatial streams to particular client stations 25. In some such embodiments, the steered portion of the data unit 300 includes different (e.g., "user-specific") content transmitted over different spatial streams to different ones of the client stations 25.

In some embodiments, the AP 14 is configured to transmit respective OFDM data units, such as the OFDM data unit 300, simultaneously to multiple client stations 25 as parts of a downlink OFDMA transmission from the AP 14 to the multiple client stations 25. In an embodiment, the AP 14 transmits the respective OFDM data units in respective sub-channels allocated to the client stations. Similarly, in an embodiment, multiple client stations 25 transmit respective OFDM data units, such as the OFDM data unit 300, simultaneously to the AP 14 as parts of an uplink OFDMA transmission from the multiple client stations 25 to the AP 14. In an embodiment, the client stations 25 transmit the respective OFDM data units in respective sub-channels allocated to the client stations 25.

In some embodiments, the uplink data units (e.g., transmitted from a client station to an AP) omit HEW-SIGBs. For instance, in some embodiments, the AP instructs client stations regarding which parameters (e.g., MCS, number of spatial streams, etc.) to use when transmitting to the AP, and thus such parameters need not be included in the PHY preamble of uplink data units. Thus, this allows omission of the HEW-SIGBs from uplink data units.

In some embodiments, SU data units omit HEW-SIGBs. For instance, in some embodiments, some parameters in the HEW-SIGB relate to multi-user transmissions, and other parameters (e.g., MCS, number of spatial streams, etc.) in the HEW-SIGB can be included in the HEW-SIGA. Thus, this allows omission of the HEW-SIGBs from SU data units.

In some embodiments, the HEW-SIGB(s) are positioned after the HEW-LTFs 330. In such embodiments, the HEW-SIGB(s) occupy the entire cumulative bandwidth of the data unit 300. For example, in the case of an OFDM data unit conforming to the HEW protocol and occupying a cumulative bandwidth such as 20 MHz, 40 MHz, 120 MHz, or 160 MHz, the HEW-SIGB(s) the corresponding entire cumulative bandwidth of the data unit, in some embodiments. In such embodiments, beamforming is applied to different spatial streams to shape, or beamform, HEW-SIGBs over the corresponding spatial streams to particular client stations 25.

In some embodiments, further SIG fields are included in the PHY preamble and positioned after the HEW-LTFs 330. In such embodiments, beamforming is applied to different spatial streams to shape, or beamform, the further SIG fields over the corresponding spatial streams to particular client stations 25.

Figure 4:
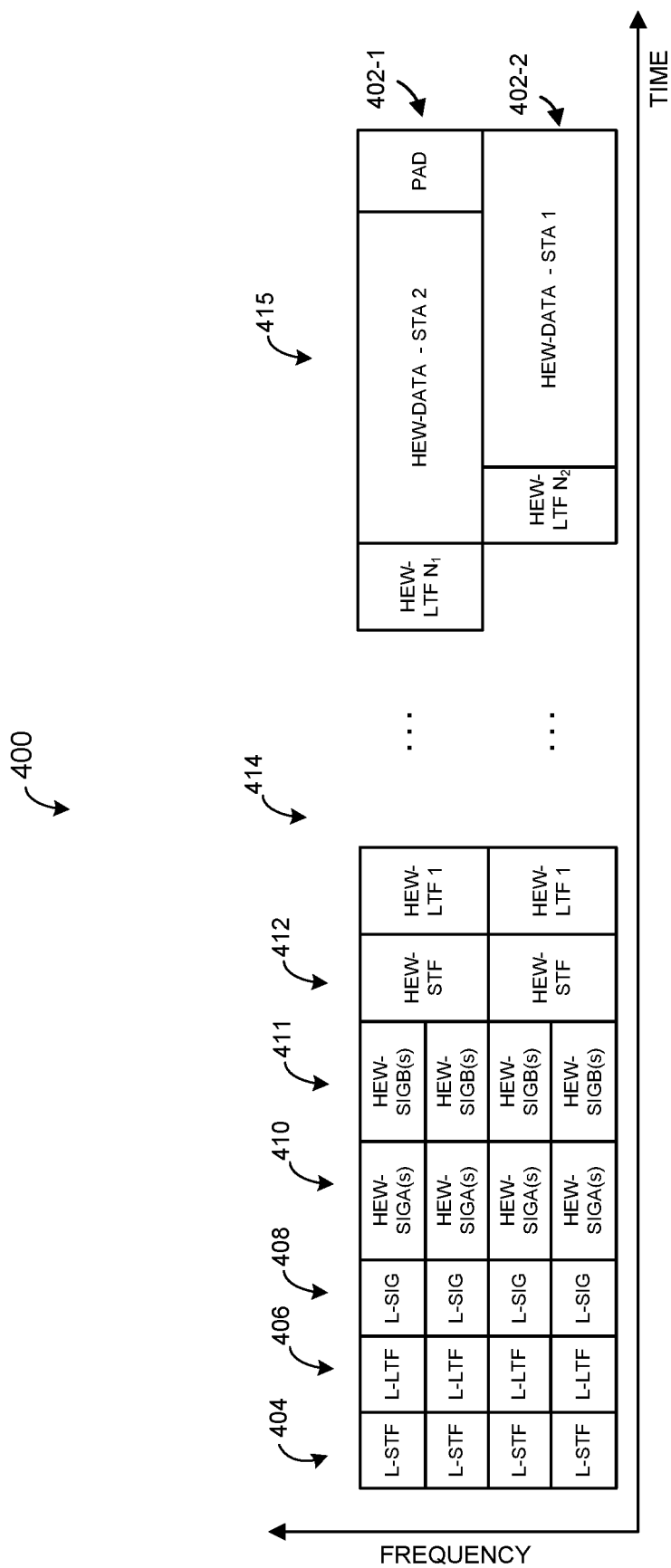
FIG. 4 is a diagram of an example multi-user PHY data unit, according to an embodiment.

FIG. 4 is a diagram of an example OFDMA PHY data unit 400, according to an embodiment. The OFDMA PHY data unit 400 includes a plurality of OFDM PHY data units 402. Respective ones of the PHY data units 402 include independent data streams transmitted to, or received from, respective ones of two client stations 25. In an embodiment, each OFDM PHY data unit 402 is the same as or similar to the OFDM PHY data unit 300 of FIG. 3. In an embodiment, the AP 14 transmits the OFDM PHY data units 402 to different client stations 25 via respective OFDM sub-channels within a composite channel spanned by the OFDMA PHY data unit 400. In another embodiment, different client stations 25 transmit respective OFDM PHY data units 402 to the AP 14 in respective OFDM sub-channels within the composite channel spanned by the OFDMA PHY data unit 400. In such an embodiment, the AP 14 receives the OFDM PHY data units 402 from the client stations 25 via respective OFDM sub-channels of within the composite channel spanned by the OFDMA PHY data unit 400. Although the PHY data unit 400 is illustrated in FIG. 4 as including only two PHY data units 402 transmitted to, or received from, only two client stations 25, the PHY data unit 400 includes more than two (e.g., 3, 4, 5, 6, etc.) PHY data units 402 transmitted to, or received from, more than two (e.g., 3, 4, 5, 6, etc.) client stations 25, in other embodiments.

Each of the OFDM PHY data units 402 conforms to a communication protocol that defines OFDMA communication, such as the HEW communication protocol, in an embodiment. In an embodiment in which the OFDMA PHY data unit 400 corresponds to a DL OFDMA data unit, the OFDMA PHY data unit 400 is generated by the AP 14 such that each OFDM PHY data unit 402 is transmitted to a respective client station 25 via a respective sub-channel allocated for downlink transmission of the OFDMA PHY data unit 400 to the client station. Similarly, an embodiment in which the OFDMA PHY data unit 400 corresponds to an UL OFDMA data unit, the AP 14 receives the OFDM PHY data units 402 via respective sub-channels allocated for uplink transmission of the OFDM PHY data units 402 from the client stations, in an embodiment. For example, the OFDM PHY data unit 402-1 is transmitted via a first 40 MHz sub-channel, and the OFDM PHY data unit 402-2 is transmitted via a second 40 MHz sub-channel, in an embodiment.

In an embodiment, each of the OFDM PHY data units 402 includes a preamble including one or more L-STFs 404, one or more L-LTFs 406, one or more L-SIGs 408, one or more HEW-SIG-As 410, N HEW-LTFs, and a HEW-SIGB 414. Additionally, each OFDM PHY data unit 402 includes a HEW-DATA portion 418. In an embodiment, each L-STF field 404, each L-LTF field 406, each L-SIG field 408, each HEW-SIGA field 410, and each HEW-SIGB field 411 occupies a smallest channel bandwidth supported by the WLAN 10 (e.g., 20 MHz). In an embodiment, if an OFDM data unit 402 occupies a bandwidth that is greater than the smallest channel bandwidth of the WLAN 10, then each L-STF field 404, each L-LTF field 406, each L-SIG field 408, each HEW-SIGA field 410, and each HEW-SIGB field 411 is duplicated in each smallest channel bandwidth portion of the OFDM data unit 402 (e.g., in each 20 MHz portion of the data unit 402). On the other hand, each HEW-STF field 412, each HEW-LTF field 414, and each HEW data portion 418 occupies an entire bandwidth of the corresponding OFDM data unit 402, in an embodiment.

In an embodiment, padding is used in one or more of the PHY OFDM data units 402 to equalize lengths of the OFDM data units 402. Accordingly, the length of each of the OFDM PHY data units 402 correspond to the length of the OFDMA PHY data unit 402, in this embodiment. Ensuring that the OFDM data units 402 are of equal lengths facilitates synchronizing transmission of acknowledgment frames by client stations 25 that receive the PHY data units 402, in an embodiment. In an embodiment, each of one or more of the OFDM PHY data units 402 includes an aggregate MAC protocol data unit (A-MPDU) (e.g., a very high throughput (VHT) A-MPDU that includes multiple aggregated VHT MAC protocol data units (MPDUs), an HEW A-MPDU that includes multiple aggregated HEW MPDUs, or another suitable aggregated data unit that includes multiple MPDUs), which is in turn included in a PPDU. In another embodiment, each of one or more of the OFDM data units 402 includes a single MPDU (e.g., a single VHT MPDU, a single HEW MPDU, or another suitable non-aggregated MPDU), which is in turn included in a PPDU. In an embodiment, padding (e.g., zero-padding) within one or more of the A-MPDUs 402 or single MPDUs 402 is used to equalize the lengths of the PHY data units 402.

In an embodiment, the AP 14 forms groups of client stations 25 for simultaneous downlink transmissions to client stations 25 and/or simultaneous uplink transmissions by client stations 25. To this end, the AP 14 allocates respective sub-channels to client stations 25 within a group of client stations 25 and/or allocates respective spatial streams to client stations 25, in embodiments. In an embodiment and/or scenario, the AP 14 then transmits one or more OFDMA PHY data units to the client stations 25 in a group using the respective sub-channels allocated to the client stations 25 within the group and/or transmits one or more MU MIMO data units to client stations 25 in a group using respective spatial streams allocated to the client stations 25 within the group. Each group of client stations 25 includes two or more client stations 25, in an embodiment. A particular client station 25 belongs to one or more groups of the client stations 25, in an embodiment. Thus, for example, a first group of client stations 25 includes the client station 25-1 and the client station 25-2, and a second group of client stations 25 includes the client station 25-1 and the client stations 25-3, in an example embodiment and/or scenario. Accordingly, the client station 25-1 belongs to the first group of client stations 25 and to the second group of client stations 25, in this example embodiment and/or scenario. In an embodiment, the AP dynamically select the members of a MU transmission.

In an embodiment, a color field is included in the HEW-SIGAs 410. In another embodiment, the color field is included in the HEW-SIGBs 411.

In some embodiments, UL OFDMA PHY data units (e.g., transmitted from a client station to an AP) omit HEW-SIGBs. For instance, in some embodiments, the AP instructs client stations regarding which parameters (e.g., MCS, number of spatial streams, etc.) to use when transmitting to the AP, and thus such parameters need not be included in the PHY preamble of uplink data units. Thus, this allows omission of the HEW-SIGBs from UL OFDMA PHY data units.

In some embodiments, the HEW-SIGBs are positioned after the HEW-LTFs 414. In such embodiments, each HEW-SIGB 411 occupies an entire bandwidth of the corresponding OFDM data unit 402. In such embodiments, beamforming is applied to different spatial streams to shape, or beamform, HEW-SIGBs 411 over the corresponding spatial streams to particular client stations 25.

In some embodiments, further SIG fields are included in the PHY preamble and positioned after the HEW-LTFs 330. In such embodiments, beamforming is applied to different spatial streams to shape, or beamform, the further SIG fields over the corresponding spatial streams to particular client stations 25.

According to an embodiment, a device (AP or client station) of a WLAN 10 may be capable of transmitting a public action frame. Public action frames are used to communicate globally (e.g., both within the BSS of the AP and to neighboring BSSs), and are intended to be received by devices both within and without the BSS with which they originate. Illustrative examples of public action frames include Generic Advertisement Service (GAS) and Fine Timing Measurement (FTM) frames. Besides public action frames, management frames (e.g., a probe request/response and association request/response) may also be transmitted outside of a BSS. If a device uses a dynamic CCA level for the reception of a public action frame or a management frame sent outside of a BSS, the public action/management frame may be improperly discarded. In order to address this issue, in an embodiment, devices in a WLAN 10 that are capable of employing dynamic CCA may refrain from using dynamic CCA when receiving a public action frame or a management frame sent outside of a BSS.

Figure 5A:
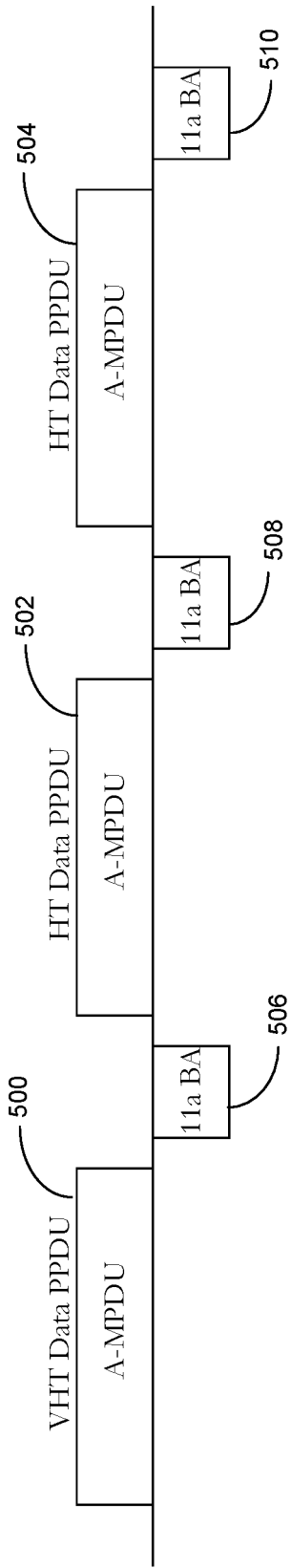
FIG. 5A is a diagram of multiple legacy A-MPDUs being block-acknowledged with legacy block acknowledgement messages, according to an embodiment.
Figure 5B:
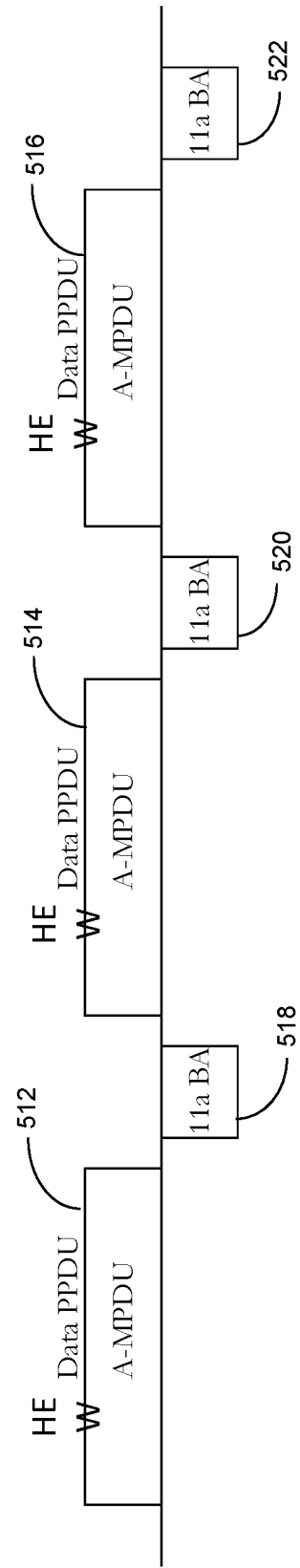
FIG. 5B is a diagram of multiple HEW A-MPDUs being block-acknowledged with legacy block acknowledgement messages, according to an embodiment.

In an embodiment, one or more of the client stations 25 is not capable of using a wireless communication protocol that recognizes BSS colors. For example, one or more of the client stations 25 may use a legacy 802.11 protocol. Such a client station may still, however, associate with an 802.11ax-capable AP 14. Furthermore, an 802.11ax-capable AP 14 may communicate using a legacy 802.11 protocol, e.g. Ack/BA frame in 11a/g PPDU for TXOP protection. As a result, communication within a WLAN 10 may take the form of, for example, a first device transmitting using 802.11ax and a second device responding (e.g., with an ACK) using a legacy 802.11 wireless communication protocol. For example, FIG. 5A illustrates communication between devices of a WLAN, in which one of the devices transmits an 802.11a block acknowledge (BA) 506 to acknowledge a VHT data PPDU 500, a BA 508 to acknowledge a High Throughput (HT) data PPDU 502, and a BA 510 to acknowledge an HT data PPDU 504. Similarly, FIG. 5B illustrates communication between devices of a WLAN, in which one of the devices transmits an 802.11a BA 518 to acknowledge an HEW data PPDU 512, a BA 520 to acknowledge an HEW data PPDU 514, and a BA 522 to acknowledge an HEW data PPDU 516.

In an embodiment, when a device (AP 14 or client station 25) of a WLAN 10 that is capable of communicating using 802.11ax receives a legacy PPDU, the device uses a normal CCA level and (a) determines whether the PPDU corresponds to self-BSS or OBSS, and (b) determines (based on the recipient address contained within the PPDU) whether the device is the proper recipient of the PPDU. For example, in some embodiments, if the device determines that the received PPDU has an energy level that is at least as high the normal CCA level, the device carries out one or more of the following processes:

(1) Check the Address 1 field (FIG. 2); if Address 1 is same as the MAC address of the device, the device acts as the TXOP responder.

(2) Check the To DS bit (in the Frame Control field, FIG. 2); if Address 1 of the decoded data frame is the MAC address of the AP 14 with which the device is associated, and the To DS is 1, the device determines that PPDU corresponds to same-BSS.

(3) Check the From DS bit (in the Frame Control, FIG. 2); if Address 2 of the decoded data frame is the MAC address of the associated AP 14 and the From DS is 1, the device determines that the PPDU corresponds to same-BSS.

(4) If the decoded frame has two MAC addresses (e.g., the frame is a control frame) and one of them is the MAC address of the associated AP 14, the device determines that the PPDU corresponds to same-BSS.

(5) If the decoded frame (e.g., a control frame) is used to acknowledge a MPDU/A-MPDU from the same-BSS, the device determines that PPDU corresponds to same-BSS.

(6) If the frame is a management frame and one of Address 1 and Address 2 of the decoded management frame is the MAC address of the associated AP 14, then the device determines that the PPDU corresponds to same-BSS.

(7) If the decoded management frame is a public action frame for inter-BSS operation or for association, the device sets the network allocation vector (NAV) in accordance with the received Duration/ID field (FIG. 2) if the value of the received Duration/ID field is bigger than the value of the NAV timer.

(8) If the device cannot correctly decode the PPDU, then the device processes the PPDU as if it corresponds to same-BSS.

(9) If none of conditions 1-8 above apply, then the device determines that the PPDU corresponds to OBSS.

(10) When the PPDU corresponds to same-BSS and the device is not the TXOP responder, the device sets the NAV in accordance with the received Duration/ID field if the value of the received Duration/ID field is bigger than the value of the NAV timer.

(11) When the PPDU corresponds to OBSS, the device sets the NAV in accordance with the received Duration/ID field if the value of the received Duration/ID field is bigger than the value of the NAV timer and the receive power of the PPDU is same as or higher than the dynamic CCA level.

In an embodiment, a device (either AP 14 or client station 25) of a WLAN 10 behaves in the role of TXOP holder or TXOP responder as follows. After a TXOP holder sends a first PPDU of the TXOP to the TXOP responder, the TXOP holder uses normal CCA level to determine whether the medium is busy or not and decodes MPDUs until the end of the TXOP. After the first successful frame exchange, the TXOP responder uses normal CCA level to decide whether the medium is busy or not and decodes MPDUs until the end of the TXOP.

In an embodiment, a device (either AP 14 or client station 25) of a WLAN 10 transmits and receives public action frames and association frames as follows. A broadcast BSS color is used for i) an HEW PPDU that carries inter-BSS frames and ii) frames for communication between an AP 14 and unassociated client station 25. If the broadcast BSS color is not acceptable, the HEW PPDU is not allowed to carry i) inter-BSS frames or ii) frames for the communication between an AP 14 and unassociated client station 25.

According to an embodiment, when a device (either AP 14 or client station 25) receives a PPDU, it carries out a backoff procedure and utilizes (if necessary) dynamic CCA as follows. Each time the channel changes from idle to busy based on the static CCA level, the PHY processing unit 20 or 29 reports static CCA busy to the MAC processing unit 18 or 28 and the MAC processing unit, in response, stops decrementing a backoff counter. If the device is a client station 25, the PPDU is a legacy PPDU, and the device determines that the legacy PPDU corresponds to OBSS and the CCA is lower than the dynamic CCA level, the device again decrements the backoff counter with each idle slot an arbitration inter-frame spacing (AIFS) after the currently detected PPDU until the beginning of the following busy indication based on the static CCA level. In some embodiments, idle slots are time slots, each of a given suitable duration (e.g., 9 µs, 20 µs, 50 µs, or any other suitable duration), in which the medium is determined to be idle. If the device is a client station 25, the PPDU is an HEW PPDU, and the device determines that the HEW PPDU corresponds to OBSS (e.g., by checking the BSS color) and the CCA is lower than the dynamic CCA level, the device again decrements the backoff counter with each idle slot an AIFS after the HE PPDU header until the beginning of the following busy indication based on the normal CCA level. In some embodiments, the device decrements the backoff counter for idle slots immediately after the legacy PPDU, or immediately after the HE PPDU header (e.g., rather than waiting the AIFS period). In some embodiments, the device decrements the backoff counter for each idle slot some other suitable time period after the ending of the legacy PPDU or the ending of the HE PPDU header, such as a Point Coordination Function (PCF) Interframe Space (PIFS) period.

Figure 6A:
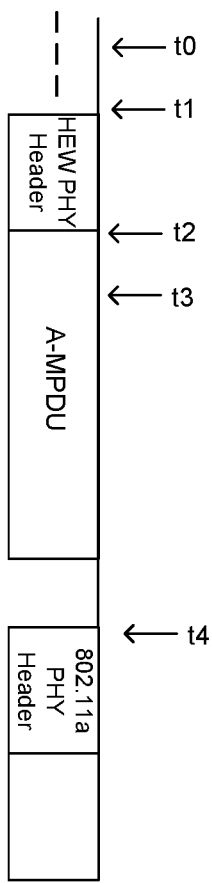
FIG. 6A is a diagram of an HEW frame, according to an embodiment.
Figure 6B:
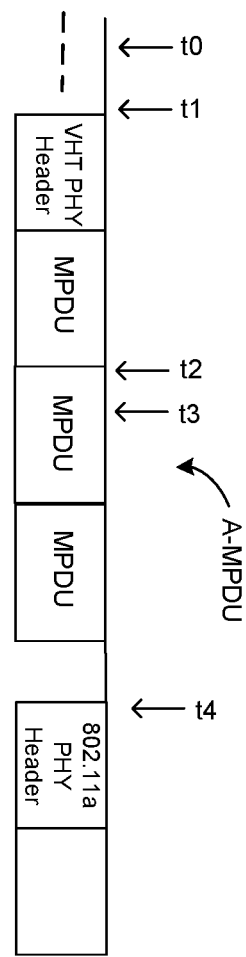
FIG. 6B is a diagram of a legacy frame that includes multiple MPDUs, according to an embodiment.
Figure 6C:
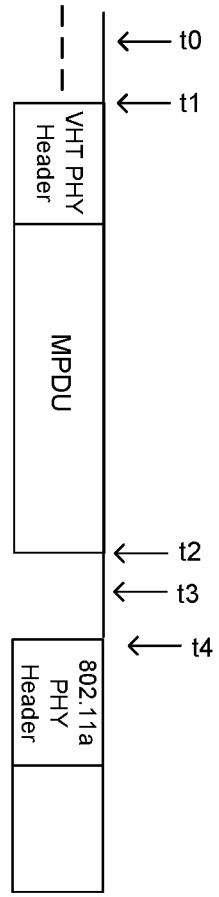
FIG. 6C is a diagram of a legacy frame that includes a single MPDU, according to an embodiment.

FIG. 6A is a diagram of an HE PPDU, FIG. 6B is a diagram of a legacy PPDU that includes an A-MPDU having multiple MPDUs, and FIG. 6C is a diagram of a legacy PPDU that includes a single MPDU. To carry out a backoff procedure according to an embodiment during receipt of each of these types of PPDUs in an embodiment, a device (either AP 14 or client station 25) uses a static CCA procedure to determine if the medium is busy, and then performs the following actions. At time t0, the device determines that the medium is idle and decrements the backoff counter. At time t1, the device detects the PPDU and, using static CCA, determines that the medium is busy and therefore ceases decrementing the backoff counter. At time t2, the device determines whether the PPDU corresponds to same-BSS or to OBSS. If the PPDU is an HEW PPDU (as in FIG. 6A), then the device makes this determination based on the BSS color (obtained from the HE PHY header). Otherwise, if the PPDU is a legacy PPDU (as in FIG. 6B), then the device makes this determination by decoding one or more MAC addresses from the first MPDU in the PPDU (e.g., the originating MAC address). If the PPDU is determined to be from OBSS and the energy level of the PPDU is below the dynamic CCA level, then the device determines the communication medium to be idle (in spite of the fact that there is still an A-MPDU being transmitted) and resumes decrementing the backoff counter for each idle slot after time t3 (e.g., immediately after the end of the HE PHY preamble, the end of the legacy PPDU, or the end of the first MPDU in the legacy PPDU, in an embodiment, an AIFS period after, in another embodiment, a PIFS period after, in another embodiment, etc.). At time t4, another PPDU begins and the device determines that the communication medium is busy based on static CCA. In response to determining that the communication medium is busy, the device ceases decrementing the backoff counter.

As can be seen in FIGS. 6B and 6C, in some embodiments, because the device must analyze a MAC header in a legacy PPDU in order to determine if the PPDU is a same-BSS or an OBSS PPDU, the device first must entirely receive an MPDU that includes the MAC header before information in the MAC header can be verified. For example, in some embodiments, the MPDU utilizes error control coding (ECC), and the device uses parity information in the MPDU (e.g., at an end of the MPDU) to verify that the MPDU (including the MAC header) is error free and/or to correct errors in the MPDU.

According to another embodiment, when a device (either AP 14 or client station 25) receives a PPDU, it carries out a backoff procedure and utilizes (if necessary) dynamic CCA as follows. Each time the channel changes from idle to busy based on a normal CCA level, the PHY processing unit 20 or 29 reports static CCA busy to the MAC processing unit 18 or 28. In response, the MAC processing unit 18 or 28 stops decrementing the backoff counter. If the device determines that a legacy PPDU corresponds to OBSS and the CCA is lower than the dynamic CCA level, the device decreases the backoff counter with each idle slot from the beginning of the PPDU. If the backoff timer is at 0 at the time that the device determines that the legacy PPDU corresponds to OBSS, the device determines that the device can immediately access the medium. If the device determines that an HEW PPDU corresponds to OBSS (e.g., by identifying the BSS color) and the CCA is lower than the dynamic CCA level, the device decreases the backoff counter with each idle slot from the beginning of the PPDU (e.g., the beginning of the HEW PPDU, in an embodiment, or the beginning of the HEW preamble, in another embodiment). In some embodiments, the device decrements the backoff counter for each idle slot a suitable time period after the start of the legacy PPDU, after the start of the HE PPDU, or the ending of the HE PPDU header, such as an AIFS period, a PIFS period, etc.

Referring again to FIGS. 6A, 6B, and 6C, to carry out a backoff procedure according to an embodiment during receipt of each of these types of PPDUs, a device (either AP 14 or client station 25) uses a static CCA procedure to determine if the medium is busy, and then performs the following actions. At time t0, the device determines that the medium is idle and decrements the backoff counter. At time t1, the device detects the PPDU and, using static CCA, determines that the medium is busy and therefore ceases decrementing the backoff counter. At time t2, the device determines whether the PPDU corresponds to same-BSS or OBSS, either through the use of the BSS color (in the case of an HEW PPDU) or through the use of a MAC address (in the case of a legacy PPDU). If the PPDU is determined to be from OBSS and the energy level of the PPDU is below the dynamic CCA level, then the device decrements the backoff counter for each idle slot from the beginning of the PPDU. In some embodiments, the device decrements the backoff counter for each idle slot a suitable time period after the start of the PPDU, such as an AIFS period, a PIFS period, etc.

According to another embodiment, when a device (either AP 14 or client station 25) receives a PPDU, the device carries out a backoff procedure and utilizes (if necessary) dynamic CCA as follows. Each time the channel changes from idle to busy based on the normal CCA level, the PHY processing unit 20 or 29 reports static CCA busy to the MAC processing unit 18 or 28. In response, the MAC processing unit 18 or 28 stops decrementing the backoff counter. If the device determines that a legacy PPDU corresponds to OBSS and the CCA is lower than the dynamic CCA level, the device then decrements the backoff counter for each idle slot from the beginning of the PPDU. If the device determines that an HEW PPDU corresponds to OBSS (e.g., by identifying the BSS color) and the CCA is lower than the dynamic CCA level, the device decreases the backoff counter with each idle slot from the beginning of the HEW PPDU (e.g., the beginning of the HEW PPDU, in an embodiment, or the beginning of the HEW preamble, in another embodiment). In some embodiments, the device decrements the backoff counter for each idle slot a suitable time period after the start of the legacy PPDU, after the start of the HE PPDU, or the beginning of the HEW preamble, such as an AIFS period, a PIFS period, etc. When the backoff timer is 0 at the time that the device determines that a legacy PPDU corresponds to OBSS, the device determines that the device has access to the medium with a probability of:

$$\text{Probability}=1-\text{REMAIN\_SLOT}/\text{SLOT\_NUM} \qquad \text{Equ. 1}$$

where REMAIN_SLOT is the value of the backoff counter at the beginning of detecting the PPDU, SLOT_NUM is the number of slots from the beginning of detecting PPDU to the time that the device determines that the legacy PPDU is from OBSS. For example, in an embodiment, the device (e.g., the network interface device 16, 27; the host 15, 26, the MAC processing unit 18, 28, etc.) includes a random number generator and uses the random number generator and the probability value (e.g., determined using Equ. 1 or another suitable equation) to determine if the device can access the medium. If the device loses the medium access right at the time that the device determines that the legacy PPDU corresponds to OBSS (e.g., if the device, using the random number generator and the determined probability, determines that the device cannot access the medium), the device resets the backoff counter value to the backoff counter value at which the device detected the PPDU.

Figure 7:
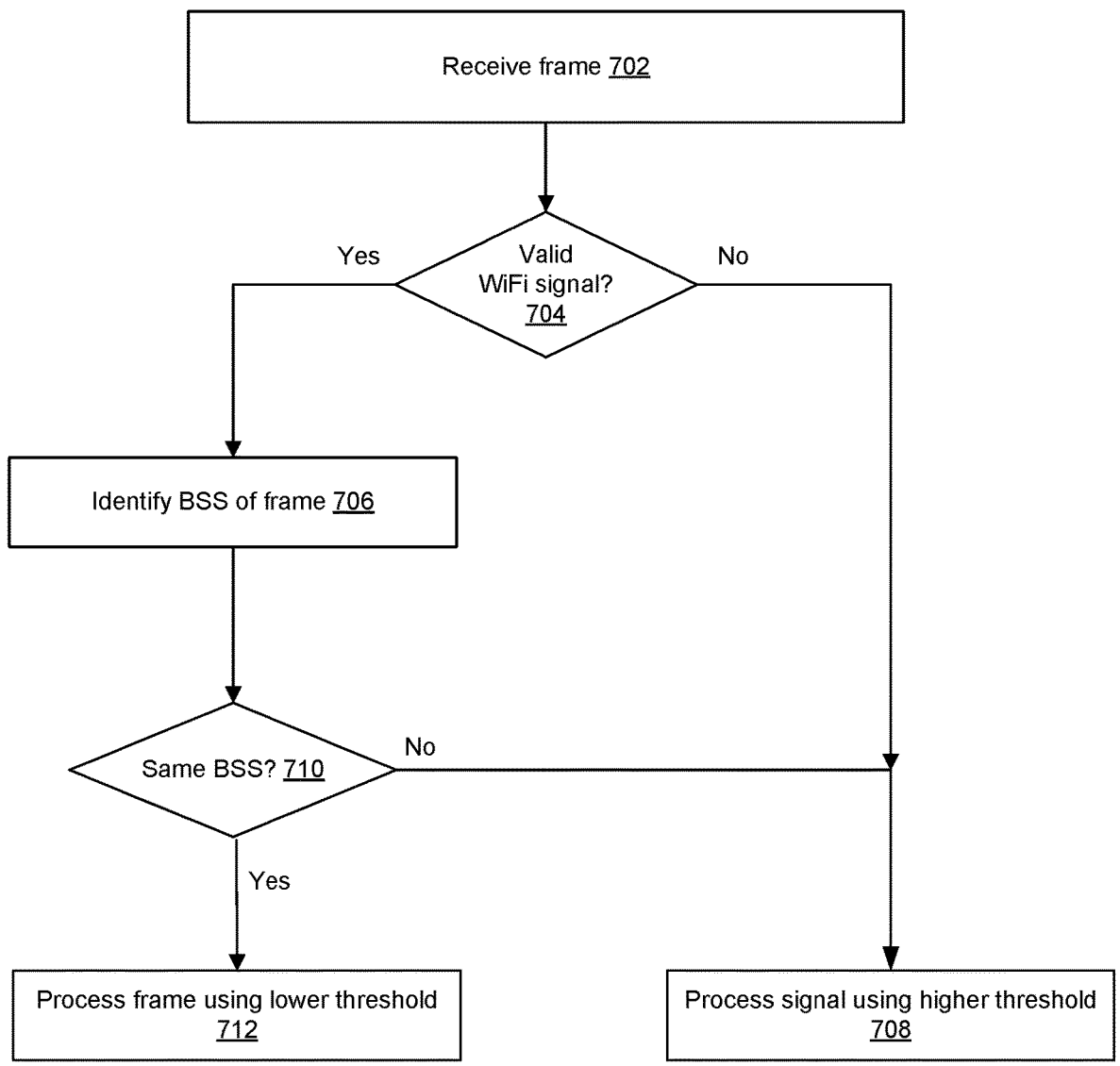
FIG. 7 is a flow diagram of an example method, according to an embodiment.
Figure 8:
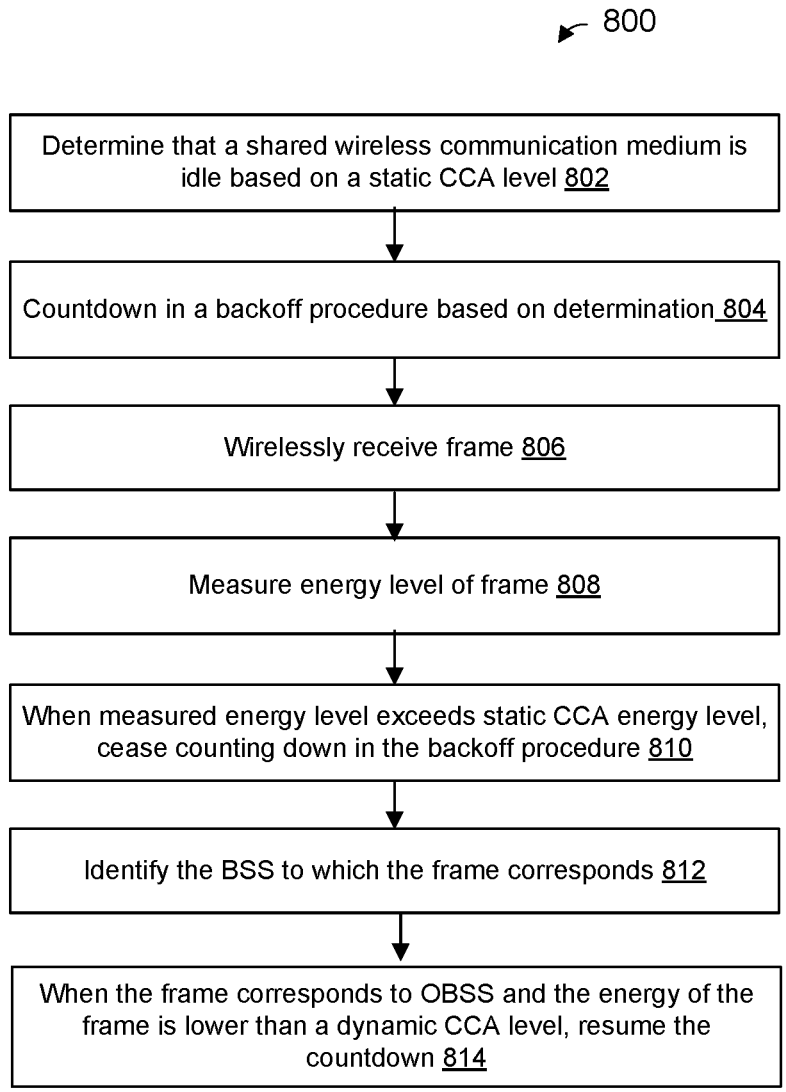
FIG. 8 is a flow diagram of an example method, according to another embodiment.
Figure 9:
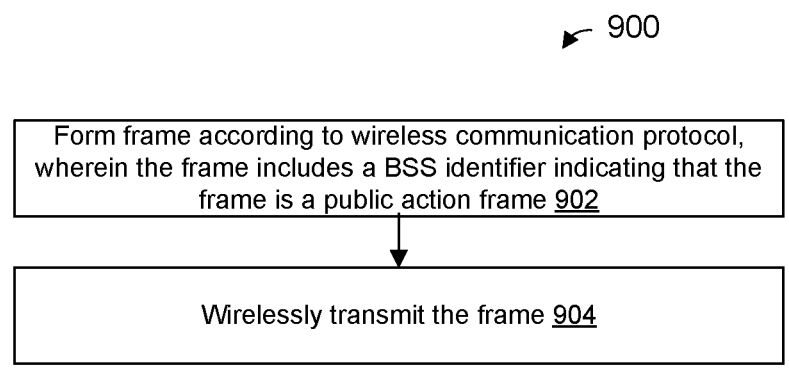
FIG. 9 is a flow diagram of an example method, according to still another embodiment.

FIGS. 7, 8, and 9 are flow diagrams of respective example methods 700, 800, and 900 according to respective embodiments. In some embodiments, one or more of the methods 700, 800, and 900 are implemented by the AP 14 (FIG. 1). In other embodiments, one or more of the methods are implemented by the client station 25. In still other embodiments, one or more of the methods are implemented by both the AP 14 and the client station 25. For example, in some embodiments, the network interface device 16 and/or 27 is configured to implement one or more of the methods 700, 800, and 900. As another example, in some embodiments, the host processor 15 is configured to implement at least a portion of one or more of the methods 700, 800, and 900. As another example, in some embodiments, the host processor 15 and/or 26 and the network interface device 16 and/or 27 are configured to implement one or more of the methods 700, 800, and 900. As yet another example, in some embodiments, the MAC processors 18 and/or 28 is configured to implement portions of one or more of the methods 700, 800, and 900, and the PHY processors 20 and/or 29 are configured to implement other portions of one or more of the methods 700, 800, and 900. In other embodiments, another suitable communication device is configured to implement one or more of the methods 700, 800, and 900.

Turning to FIG. 7, at block 702, a communication frame is received. At block 704, a determination is made as to whether the communication frame is a valid WiFi signal. In some embodiments, the PHY processors 20 and/or 29 are configured to determine whether signal is a valid WiFi signal by determining whether the signal includes a PHY preamble that complies with a WiFi communication protocol. If it is determined that the communication frame is not a valid WiFi signal, at block 708, an energy level of the signal is compared to a first threshold as part of a CCA procedure. The first threshold is higher than a second threshold also used as part of the CCA procedure, as will be described below. In some embodiments, the PHY processors 20 and/or 29 are configured to determine energy levels of signal, and the MAC processors 18 and/or 28, and/or the PHY processors 20 and/or 29 are configured to compare energy levels to thresholds.

On the other hand, if it is determined at block 704 that the signal is a valid WiFi signal, the flow proceeds to block 706. At block 706, the BSS to which the communication frame corresponds is identified. At block 710, a determination is made as to whether the BSS to which the communication frame corresponds is the same as the BSS to which the device carrying out the method 700 corresponds. At block 712, if the BSS is the same, the energy level of the signal is compared to the second threshold as part of the CCA procedure, where the second threshold is lower than the first threshold.

On the other hand, if it is determined at block 710 that the BSS is not the same, then the flow proceeds to block 708, at which the energy level of the signal is compared to the first threshold as part of a CCA procedure.

In some embodiments, block 710 includes determining if the frame is a public action frame. In some embodiments, if it is determined that the frame is a public action frame, the frame is processed using the lower threshold at block 712. In some embodiments, block 710 includes determining if the frame is a management frame transmitted outside of a BSS (e.g., a probe request/response and association request/response). In some embodiments, if it is determined that the frame is a management frame transmitted outside of a BSS (e.g., a probe request/response and association request/response), the frame is processed using the lower threshold at block 712.

In some embodiments, if it is determined at block 710 that the BSS is not the same, the energy level of the signal is compared to the third threshold, where the third threshold is higher than the second threshold but lower than the first threshold.

Turning to FIG. 8, at block 802, a determination is made that a shared wireless communication medium is idle based on a static CCA procedure (e.g., a signal energy level is compared to i) a first threshold if the signal is not a valid WiFi signal or ii) a second threshold if the signal is a valid WiFi signal, where the first threshold is higher than the second threshold). At block 804, a countdown in a backoff procedure is carried out based on the determination. For example, if it is determined at block 804 that the medium is idle, a backoff counter is decremented, according to an embodiment. At block 806, a communication frame is wirelessly received. At block 808, the energy level of the frame is measured. At block 810, when the energy level exceeds the static CCA energy level (e.g., a signal energy level is compared to i) a first threshold if the signal is not a valid WiFi signal or ii) a second threshold if the signal is a valid WiFi signal, where the first threshold is higher than the second threshold), counting down in the backoff procedure is ceased (e.g., decrementing the backoff counter is paused, in an embodiment). At block 812, the BSS to which the frame corresponds is identified. At block 814, when the frame corresponds to OBSS and the energy of the frame is lower than a dynamic CCA level (e.g., the first threshold, in an embodiment, a third threshold which is higher than the second threshold and lower than the first threshold, in another embodiment), the countdown is resumed. For example, if it is determined at block 814 that the frame corresponds to OBSS and the energy of the frame is lower than the dynamic CCA level, decrementing the backoff counter is resumed, according to an embodiment.

In an embodiment, block 814 includes decrementing a backoff counter for each idle slot immediately after determining the energy of the frame is lower than the dynamic CCA level. In another embodiment, block 814 includes decrementing a backoff counter for each idle slot a predetermined time period (e.g., AIFS) after determining the energy of the frame is lower than the dynamic CCA level. In another embodiment, block 814 includes decrementing a backoff counter for each idle slot after the beginning of the PPDU. In another embodiment, block 814 includes decrementing a backoff counter for each idle slot after a legacy portion of a PHY preamble of the PPDU.

In some embodiments, the method 800 further includes, if the backoff counter is zero when it is determined at block 814 that the energy level of a legacy PPDU of an OBSS is below the second, higher threshold, the device determines that the device can access the medium.

In some embodiments, the method 800 further includes, if the backoff counter is zero when it is determined at block 814 that the energy level of a legacy PPDU of an OBSS is below the second, higher threshold, the device determines a probability that the device can access the medium (e.g., using Equ. 1 or another suitable equation) and then determines whether the device can access the medium based on the determined probability (e.g., using a random number generator). In an embodiment, if the device determines that the device cannot access the medium, the device resets the backoff counter value to the backoff counter value at which the device detected the PPDU and continues the backoff countdown procedure.

In some embodiments, method 800 further includes determining if the frame is a public action frame. In some embodiments, if it is determined that the frame is a public action frame, the frame is processed using the lower threshold at block 814.

Turning to FIG. 9, at block 902, a communication frame is generated to include, in a PHY preamble of the communication frame, a BSS identifier indicating that the frame is a public action frame. For example, in an embodiment, the BSS identifier is a BSS color value reserved for public action frames. In an embodiment, the BSS identifier is included in a signal field (e.g., HE SIGA) in the PHY preamble. At block 904, the communication frame is wirelessly transmitted.

In some embodiments, block 902 comprises, for frames that are management frames to be transmitted outside of a BSS (e.g., probe request/responses and association request/responses), including, in the PHY preamble, a BSS identifier indicating that the frame is a public action frame. In some embodiments, block 902 comprises, for frames that are management frames to be transmitted outside of a BSS (e.g., probe request/responses and association request/responses), including, in the PHY preamble, a BSS identifier indicating that the frame is a management frame transmitted outside of a BSS (e.g., probe request/responses and association request/responses).

At least some of the various blocks, operations, and techniques described above may be implemented utilizing hardware, a processor executing firmware instructions, a processor executing software instructions, or any combination thereof. Examples of suitable hardware include a microprocessor, microcontroller, one or more integrated circuits, one or more application specific integrated circuits (ASICs), one or more field programmable gate arrays, one or more programmable logic devices, etc. When implemented utilizing a processor executing software or firmware instructions, the software or firmware instructions may be stored on a computer readable medium, or media, such as a magnetic disk, an optical disk, a random access memory (RAM), a read only memory (ROM), a flash memory, a magnetic tape, etc. The software or firmware instructions may include machine readable instructions that, when executed by one or more processors, cause the one or more processors to perform various acts.

When implemented in hardware, the hardware may comprise one or more of i) discrete components, ii) one or more integrated circuits, iii) one or more ASICs, iv) one or more programmable logic devices, etc.

While the present disclosure has been described with reference to specific examples, which are intended to be illustrative only and not to be limiting of the invention, changes, additions and/or deletions may be made to the disclosed embodiments without departing from the scope of the claims.

What is claimed is:
1. A method, comprising:
   determining, at a communication device, that a wireless communication channel is idle;
   in response to determining that the wireless communication channel is idle, decrementing a backoff counter of the communication device;
   detecting, at the communication device, reception of a physical layer protocol data unit (PPDU);
   during reception of a beginning portion of the PPDU, comparing, at the communication device, an energy level associated with the PPDU to a first threshold;
   in response to determining that the energy level associated with the PPDU exceeds the first threshold, pausing, at the communication device, the backoff counter;
   determining, at the communication device, whether to compare, after pausing the backoff counter, the energy level associated with a remaining portion of the PPDU to a second threshold that is higher than the first threshold, including determining that the energy level associated with the remaining portion of the PPDU should be compared to the first threshold when a physical layer (PHY) preamble of the PPDU includes a basic service set (BSS) color field set to a value reserved for inter-BSS communications and communications with unassociated client stations;
   in response to determining that the energy level associated with the remaining portion of the PPDU is to be compared to the first threshold:

decrementing, at the communication device, the backoff counter when the energy level associated with the PPDU does not exceed the first threshold, and pausing, at the communication device, the backoff counter when the energy level associated with the PPDU exceeds the first threshold; and in response to determining that the energy level associated with the remaining portion of the PPDU is to be compared to the second threshold:

decrementing, at the communication device, the backoff counter when the energy level associated with the PPDU does not exceed the second threshold, and pausing, at the communication device, the backoff counter when the energy level associated with the PPDU exceeds the second threshold.

2. The method of claim 1, wherein determining whether to compare, after pausing the backoff counter, the energy level associated with a remaining portion of the PPDU to the second threshold further includes:

determining whether any media access control (MAC) addresses included in a MAC layer header of the PPDU corresponds to an access point (AP) with which the communication device is associated.

3. The method of claim 2, wherein determining whether to compare, after pausing the backoff counter, the energy level associated with a remaining portion of the PPDU to the second threshold further includes:

determining that the energy level associated with the remaining portion of the PPDU should be compared to the first threshold when one of the MAC addresses in the MAC layer header of the PPDU corresponds to the AP with which the communication device is associated.

4. The method of claim 1, wherein:

the PPDU includes a duration field in a media access control (MAC) layer header of the PPDU; and the method further comprises: when i) the PPDU corresponds to the BSS with which the communication device is associated and ii) the communication device is not a transmission opportunity (TXOP) responder, setting a network allocation vector (NAV) timer according to the duration field if a value in the duration field is larger than a value of the NAV timer.

5. The method of claim 1, wherein:

comparing, during reception of the beginning portion of the PPDU, the energy level associated with the PPDU to the first threshold is performed by a physical layer (PHY) processor of the communication device;

the method further comprises: signaling, by the PHY processor to a media access control (MAC) processor of the communication device, whether the energy level associated with the PPDU exceeds the first threshold;

pausing the backoff counter is performed by the MAC processor in response to the PHY processor signaling that the energy level associated with the PPDU exceeds the first threshold.

6. The method of claim 5, further comprising, in response to determining that the energy level associated with the remaining portion of the PPDU is to be compared to the first threshold:

comparing, by the PHY processor, the energy level associated with the PPDU to the first threshold;

signaling, by the PHY processor to the MAC processor, whether the energy level associated with the PPDU exceeds the first threshold;

wherein decrementing the backoff counter when the energy level associated with the PPDU does not exceed the first threshold is performed by the MAC processor; and wherein pausing the backoff counter when the energy level associated with the PPDU exceeds the first threshold is performed by the MAC processor.

7. The method of claim 6, further comprising, in response to determining that the energy level associated with the remaining portion of the PPDU is to be compared to the second threshold:

comparing, by the PHY processor, the energy level associated with the PPDU to the second threshold; and signaling, by the PHY processor to the MAC processor, whether the energy level associated with the PPDU exceeds the second threshold;

wherein decrementing the backoff counter when the energy level associated with the PPDU does not exceed the second threshold is performed by the MAC processor; and wherein pausing the backoff counter when the energy level associated with the PPDU exceeds the second threshold is performed by the MAC processor.

8. An apparatus, comprising:

a wireless network interface device associated with a communication device, wherein the wireless network interface device includes one or more integrated circuit (IC) devices configured to:

determine that a wireless communication channel is idle, in response to determining that the wireless communication channel is idle, decrement a backoff counter, detect reception of a physical layer protocol data unit (PPDU), during reception of a beginning portion of the PPDU, compare an energy level associated with the PPDU to a first threshold, in response to determining that the energy level associated with the PPDU exceeds the first threshold, pause the backoff counter, and determine whether to compare, after pausing the backoff counter, the energy level associated with a remaining portion of the PPDU to a second threshold that is higher than the first threshold, including determining that the energy level associated with the remaining portion of the PPDU should be compared to the first threshold when a physical layer (PHY) preamble of the PPDU includes a basic service set (BSS) color field set to a value reserved for inter-BSS communications and communications with unassociated client stations;

wherein the one or more IC devices are further configured to, in response to determining that the energy level associated with the remaining portion of the PPDU is to be compared to the first threshold:

decrement the backoff counter when the energy level associated with the PPDU does not exceed the first threshold, and pause the backoff counter when the energy level associated with the PPDU exceeds the first threshold; and wherein the one or more IC devices are further configured to, in response to determining that the energy level associated with the remaining portion of the PPDU is to be compared to the second threshold:

decrement the backoff counter when the energy level associated with the PPDU does not exceed the second threshold, and pause the backoff counter when the energy level associated with the PPDU exceeds the second threshold.

9. The apparatus of claim 8, wherein the one or more IC devices are further configured to:
determine whether any media access control (MAC) addresses included in a MAC layer header of the PPDU corresponds to an access point (AP) with which the communication device is associated as part of determining whether to compare, after pausing the backoff counter, the energy level associated with a remaining portion of the PPDU to the second threshold.

10. The apparatus of claim 9, wherein the one or more IC devices are further configured to:
determine that the energy level associated with the remaining portion of the PPDU should be compared to the first threshold when one of the MAC addresses in the MAC layer header of the PPDU corresponds to the AP with which the communication device is associated.

11. The apparatus of claim 8, wherein:
the PPDU includes a duration field in a media access control (MAC) layer header of the PPDU; and
the one or more IC devices are further configured to: when i) the PPDU corresponds to the BSS with which the communication device is associated and ii) the communication device is not a transmission opportunity (TXOP) responder, set a network allocation vector (NAV) timer according to the duration field if a value in the duration field is larger than a value of the NAV timer.

12. The apparatus of claim 8, wherein:
the wireless network interface device includes:
a physical layer (PHY) processor implemented on the one or more IC devices, and
a media access control (MAC) processor coupled to the PHY processor;
the MAC processor is implemented on the one or more IC devices;
the PHY processor is configured to:
compare, during reception of the beginning portion of the PPDU, the energy level associated with the PPDU to the first threshold, and
signal, to the MAC processor, whether the energy level associated with the PPDU exceeds the first threshold; and
the MAC processor is configured to: pause the backoff counter in response to the PHY processor signaling that the energy level associated with the PPDU exceeds the first threshold.

13. The apparatus of claim 12, wherein:
the PHY processor is configured to, in response to determining that the energy level associated with the remaining portion of the PPDU is to be compared to the first threshold:
compare the energy level associated with the PPDU to the first threshold, and
signal, to the MAC processor, whether the energy level associated with the PPDU exceeds the first threshold; and
the MAC processor is configured to, in response to determining that the energy level associated with the remaining portion of the PPDU is to be compared to the first threshold:
decrement the backoff counter when the PHY processor signals that the energy level associated with the PPDU does not exceed the first threshold, and
pause the backoff counter when the PHY processor signals that the energy level associated with the PPDU exceeds the first threshold.

14. The apparatus of claim 13, wherein:
the PHY processor is configured to, in response to determining that the energy level associated with the remaining portion of the PPDU is to be compared to the second threshold:
compare the energy level associated with the PPDU to the second threshold, and
signal, to the MAC processor, whether the energy level associated with the PPDU exceeds the second threshold;
the MAC processor is configured to, in response to determining that the energy level associated with the remaining portion of the PPDU is to be compared to the second threshold:
decrement the backoff counter when the PHY processor signals that the energy level associated with the PPDU does not exceed the second threshold, and
pause the backoff counter when the PHY processor signals that the energy level associated with the PPDU exceeds the second threshold.

15. The apparatus of claim 12, wherein: the PHY processor comprises one or more transceivers.

16. The apparatus of claim 15, further comprising: one or more antennas coupled to the one or more transceivers.

17. The apparatus of claim 16, further comprising: a host processor coupled to the network interface device.

* * * * *